（12）United States Patent
Kitani et al.

(10) Patent No.: US 10,124,628 B2
(45) Date of Patent: Nov. 13, 2018

(54) HEAVY DUTY PNEUMATIC TIRE

(71) Applicant: SUMITOMO RUBBER INDUSTRIES, LTD., Kobe-shi, Hyogo (JP)

(72) Inventors: Naofumi Kitani, Kobe (JP); Atsushi Maehara, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 382 days.

(21) Appl. No.: 14/975,092

(22) Filed: Dec. 18, 2015

(65) Prior Publication Data

US 2016/0193883 A1   Jul. 7, 2016

(30) Foreign Application Priority Data

Jan. 6, 2015  (JP) .................................. 2015-001088
Feb. 2, 2015  (JP) .................................. 2015-018519

(51) Int. Cl.
 B60C 11/11   (2006.01)
 B60C 11/03   (2006.01)
 B60C 11/12   (2006.01)

(52) U.S. Cl.
 CPC ........... B60C 11/0306 (2013.01); B60C 11/11 (2013.01); *B60C 2011/0334* (2013.01);
 (Continued)

(58) Field of Classification Search
 CPC ............................ B60C 11/11; B60C 11/0306
 See application file for complete search history.

(56) References Cited

U.S. PATENT DOCUMENTS 4,676,290 A * 6/1987 Tansei .................... B60C 11/11
                                                            152/209.22
2006/0102267 A1* 5/2006 Takahashi ........... B60C 11/0306
                                                            152/209.18
(Continued)

FOREIGN PATENT DOCUMENTS

EP          3023269 A1     5/2016
JP       2007-145209 A    6/2007
(Continued)

OTHER PUBLICATIONS

Extended European Search Report, dated Jun. 9, 2016, for European Application No. 15202101.0.
(Continued)

*Primary Examiner* — Robert C Dye
(74) *Attorney, Agent, or Firm* — Birch, Stewart, Kolasch & Birch, LLP (57) ABSTRACT

A heavy duty pneumatic tire 1 comprises a tread portion 2 provided with a crown land portion 6 formed between a center main groove 3 and a middle main groove 4 and having an axial width varying periodically in the tire circumferential direction. The center main groove 3 comprises first oblique groove segments 3A inclined with respect to the tire circumferential direction to one axial direction at an angle, and second oblique groove segments 3B inclined with respect to the tire circumferential direction to the other axial direction at an angle less than the angle of the first oblique groove segments. The crown land portion 6 is divided into hexagonal crown blocks 11 by crown lateral grooves 9 extending between axially inwardly protruding zigzag vertex portions of the center main groove 3 and axially outwardly protruding zigzag vertex portions of the middle main groove 4. The crown lateral grooves 9 and the first oblique
(Continued)

groove segments 3A are inclined with respect to the tire axial direction to one circumferential direction.

14 Claims, 7 Drawing Sheets (52) U.S. Cl.
CPC ............. *B60C 2011/0344* (2013.01); *B60C 2011/0346* (2013.01); *B60C 2011/0353* (2013.01); *B60C 2011/0365* (2013.01); *B60C 2011/0367* (2013.01); *B60C 2011/0372* (2013.01); *B60C 2011/1213* (2013.01)

(56) References Cited

U.S. PATENT DOCUMENTS

2014/0158261 A1* 6/2014 Takahashi ........... B60C 11/0306
152/209.8
2015/0352903 A1 12/2015 Ookawa et al.

FOREIGN PATENT DOCUMENTS

| JP | 2012-51504 A | 3/2012 |
| WO | WO 2014/119338 A1 | 8/2014 |

OTHER PUBLICATIONS

Extended European Search Report dated Nov. 21, 2017, for Application No. 17184386.5.

\* cited by examiner

HEAVY DUTY PNEUMATIC TIRE

BACKGROUND OF THE INVENTION

The present invention relates to a heavy duty pneumatic tire, more particularly to a tread pattern capable of improving traveling performance on snowy roads, without sacrificing uneven wear resistance.

In heavy duty pneumatic tires for trucks, buses and the like, in order to improve the traveling performance on snowy roads, block-based tread patterns have been widely employed. The blocks in the tread portion of such a heavy duty pneumatic tire are liable to cause uneven wear so called heel-and-toe wear. Therefore, in order to improve the resistance to such uneven wear, it has been employed to increase the blocks' circumferential rigidity by decreasing the volume of lateral grooves which circumferentially divide the blocks.

This technique, however, tends to deteriorate traveling performance on snowy roads such as braking performance, traction performance and the like because, in the ground contacting patch of the tire, shearing force of the snow packed into the lateral grooves is decreased.

SUMMARY OF THE INVENTION

It is therefore, an object of the present invention to provide a heavy duty pneumatic tire in which traveling performance on snowy roads is improved without sacrificing the resistance to uneven wear.

According to the present invention, a heavy duty pneumatic tire comprises
a tread portion provided with circumferentially continuously extending zigzag main grooves,
wherein
the zigzag main grooves include
a center main groove disposed on the tire equator and
a middle main groove disposed on each side of the center main groove,
the center main groove comprises
first oblique groove segments inclined with respect to the tire circumferential direction to one axial direction at an angle, and
second oblique groove segments inclined with respect to the tire circumferential direction to the other axial direction at an angle less than the angle of the first oblique groove segments,
a crown land portion formed between the center main groove and each of the middle main grooves has an axial width which repeats increase and decrease in the tire circumferential direction, and
the crown land portion is provided with a plurality of crown lateral grooves which extend between axially outwardly protruding zigzag vertex portions of the center main groove and
axially inwardly protruding zigzag vertex portions of the middle main groove so that the crown land portion is circumferentially divided into crown blocks each having a hexagonal tread, and
the crown lateral grooves of the crown land portions and the first oblique groove segments of the center main groove are inclined with respect to the tire axial direction to one circumferential direction.

It is preferable that the crown blocks are each provided with a crown sipe extending between one of the second oblique groove segments of the center main groove and one of the axially outwardly protruding zigzag vertex portions of the adjacent middle main groove.

It is preferable that the circumferential distance between an open end of the crown sipe at the center main groove and an axially inwardly protruding end of the crown block is 10% to 20% of the maximum circumferential length (LC) of the crown block.

It is preferable that the angles of oblique groove segments of the middle main grooves with respect to the tire circumferential direction are less than the angle of the second oblique groove segments of the center main groove with respect to the tire circumferential direction.

It is preferable that the groove width of the center main groove is less than the groove width of the middle main grooves.

It is preferable that the groove width of the crown lateral grooves is more than the groove width of the center main groove.

It is preferable that the axial length of the crown lateral groove is 9% to 17% of the tread width.

It is preferable that the angle of the middle main grooves with respect to the tire circumferential direction is 1 to 9 degrees.

It is preferable that the angle of the first oblique groove segments with respect to the tire circumferential direction is 4 to 13 degrees, and
the angle of the second oblique groove segments with respect to the tire circumferential direction is 1 to 9 degrees.

It is preferable that the aspect ratio (LC/WC) of the maximum circumferential length (LC) and maximum axial width (WC) of the crown block is 2.0 to 2.6.

According to the present invention, the heavy duty pneumatic tire is provided with the hexagonal crown blocks whose axial width is decreased toward its both ends in the tire circumferential direction. Therefore, both end portions of the hexagonal crown block can be appropriately deformed when contacting with and leaving from the road surface. As a result, their slippage on the road surface is suppressed, and wear energy in the both end portions is reduced to improve the uneven wear resistance.

The first oblique groove segments inclined at the larger angle can produce stiff compacted snow therein.

Further, during straight running, by a force in the tire circumferential direction, both groove walls of the first oblique groove segment are moved toward each other. Therefore, the land portions on both sides of the first oblique groove segment are prevented from being deformed in the tire circumferential direction. Thereby, the slippage on the road surface is further suppressed.

The second oblique groove segments inclined at the smaller angle can maintain high pattern rigidity of the crown land portions on both sides of the second oblique groove segments.

Accordingly, the center main groove can suppress the slippage on the road surface during straight running, while increasing the rigidity of the crown land portion subjected to higher ground pressure.

Further, as the center main groove increases the shearing force of the compacted snow, straight running stability on snowy roads can be improved.

The first oblique groove segments inclined more than the second oblique groove segments have higher snow ejecting resistance at their connecting positions with the second oblique groove segments, and snow in the first oblique groove segments is hard to be forced toward the second oblique groove segments. In the present invention, since the crown lateral grooves and the first oblique groove segments are inclined with respect to the tire axial direction to the same circumferential direction, the snow in the first oblique groove segments can be discharged to the middle main grooves through the crown lateral grooves by utilizing rotations of the tire. Therefore, the traveling performance on snowy roads is further improved.

As descried above, in the heavy duty pneumatic tire of the present invention, the uneven wear resistance and the traveling performance on snowy roads can be improved by providing the hexagonal crown blocks, and the crown lateral grooves and the first oblique groove segments oriented to the same direction.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENTS

Embodiments of the present invention will now be described in detail in conjunction with the accompanying drawings.

The heavy duty pneumatic tire 1 according to the present invention comprises a tread portion 2, a pair of axially spaced bead portions each with a bead core therein, a pair of sidewall portions extending between the tread edges and the bead portions, a carcass extending between the bead portions, and a tread reinforcing cord layers disposed radially outside the carcass in the tread portion as usual.

In the following embodiment, the heavy duty pneumatic tire is designed for trucks and buses.

Figure 1:
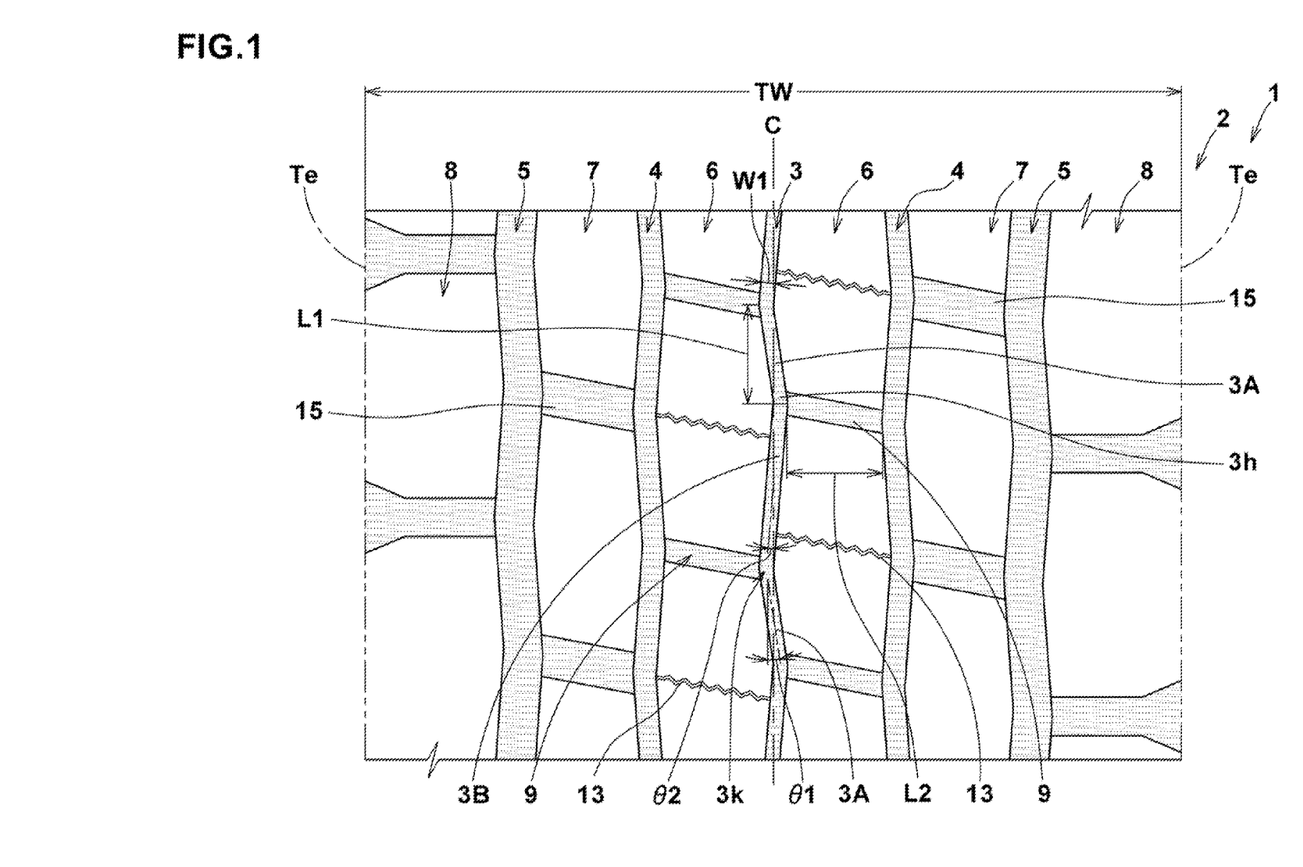
FIG. 1 is a developed partial view of the tread portion of a pneumatic tire as an embodiment of the present invention.

As shown in FIG. 1, the tread portion 2 is provided with main grooves extending continuously in the tire circumferential direction.

The main grooves include: a zigzag center main groove 3 disposed on the tire equator C; a zigzag middle main groove 4 disposed on each side of the tire equator C; and a shoulder main groove 5 disposed axially outside each of the middle main grooves 4.

The center main groove 3 comprises alternate first oblique groove segments 3A and second oblique groove segments 3B inclined with respect to the tire circumferential direction.

Toward one tire circumferential direction, the first oblique groove segments 3A are inclined to one axial direction at an angle, and the second oblique groove segments 3B are inclined to the other axial direction at an angle less than the angle of the first oblique groove segments 3A.

The first oblique groove segments 3A inclined at the larger angle with respect to the tire circumferential direction can produce stiff compacted snow. Further, during straight running, by a force in the tire circumferential direction, both groove walls of the first oblique groove segment 3A are moved toward each other. Therefore, the land portions on both sides of the first oblique groove segment 3A are prevented from being deformed in the tire circumferential direction. Thereby, the slippage on the road surface is prevented. The second oblique groove segments 3B inclined at the smaller angle can maintain high circumferential rigidity of the land portions on both sides of the second oblique groove segment 3B. Accordingly, during straight running, the center main groove 3 increases the circumferential rigidity of the land portions on both sides of the center main groove 3 subjected to higher ground pressure, prevents the slippage on the road surfaces, and increases the shearing force of the compacted snow, therefore, the uneven wear resistance and the straight running stability on snowy roads in particular can be highly improved.

The center main groove 3 has
zigzag vertex portions $3h$ protruding toward one tire axial direction (right-hand side in FIG. 1) and
zigzag vertex portions $3k$ protruding toward the other tire axial direction (left-hand side in FIG. 1).

Preferably, the first oblique groove segments 3A are inclined at an angle θ1 in a range of not less than 4 degrees, but not more than 13 degrees with respect to the tire circumferential direction, and
the second oblique groove segments 3B are inclined at an angle θ2 in a range of not less than 1 degree, more preferably not less than 2 degrees, but not more than 9 degree with respect to the tire circumferential direction.

If the angle θ1 of the first oblique groove segments 3A exceeds 13 degrees, or the angle θ2 of the second oblique groove segments 3B exceeds 9 degrees, there is a possibility that the rigidity of the land portions near the zigzag vertex portions 3h, 3k of the center main groove 3 is excessively decreased.

If the angle θ1 of the first oblique groove segments 3A is less than 4 degrees, or the angle θ2 of the second oblique groove segments 3B is less than 1 degree, there is a possibility that the axial components of the respective oblique groove segments 3A, 3B become decreased, and the shearing force of the compacted snow is decreased.

The circumferential length L1 of the first oblique groove segments 3A is preferably set in a range of not less than 5%, but not more than 17% of the tread width TW in order to increase the pattern rigidity of the land portions on both sides of the center main groove 3 and the shearing force of the compacted snow in good balance.

The groove width w1 of the center main groove 3 is constant along its length. Preferably, the groove width w1 is not less than 0.5%, but not more than 3% of the tread width TW. Such center main groove 3 maintains high rigidity on both sides thereof.

Figure 2:
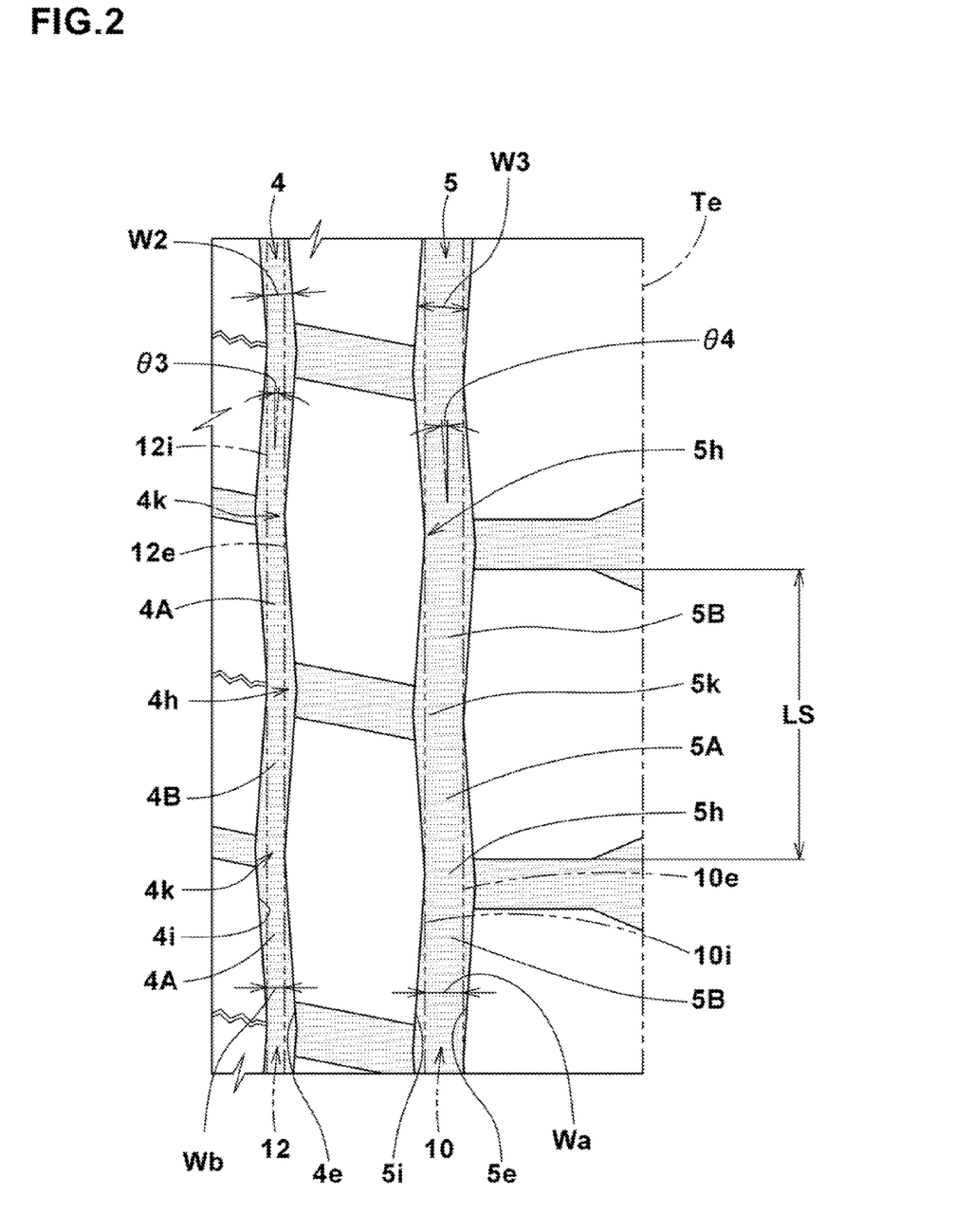
FIG. 2 and FIG. 3 are a closeup of the middle land portion and the shoulder land portion thereof.
Figure 3:
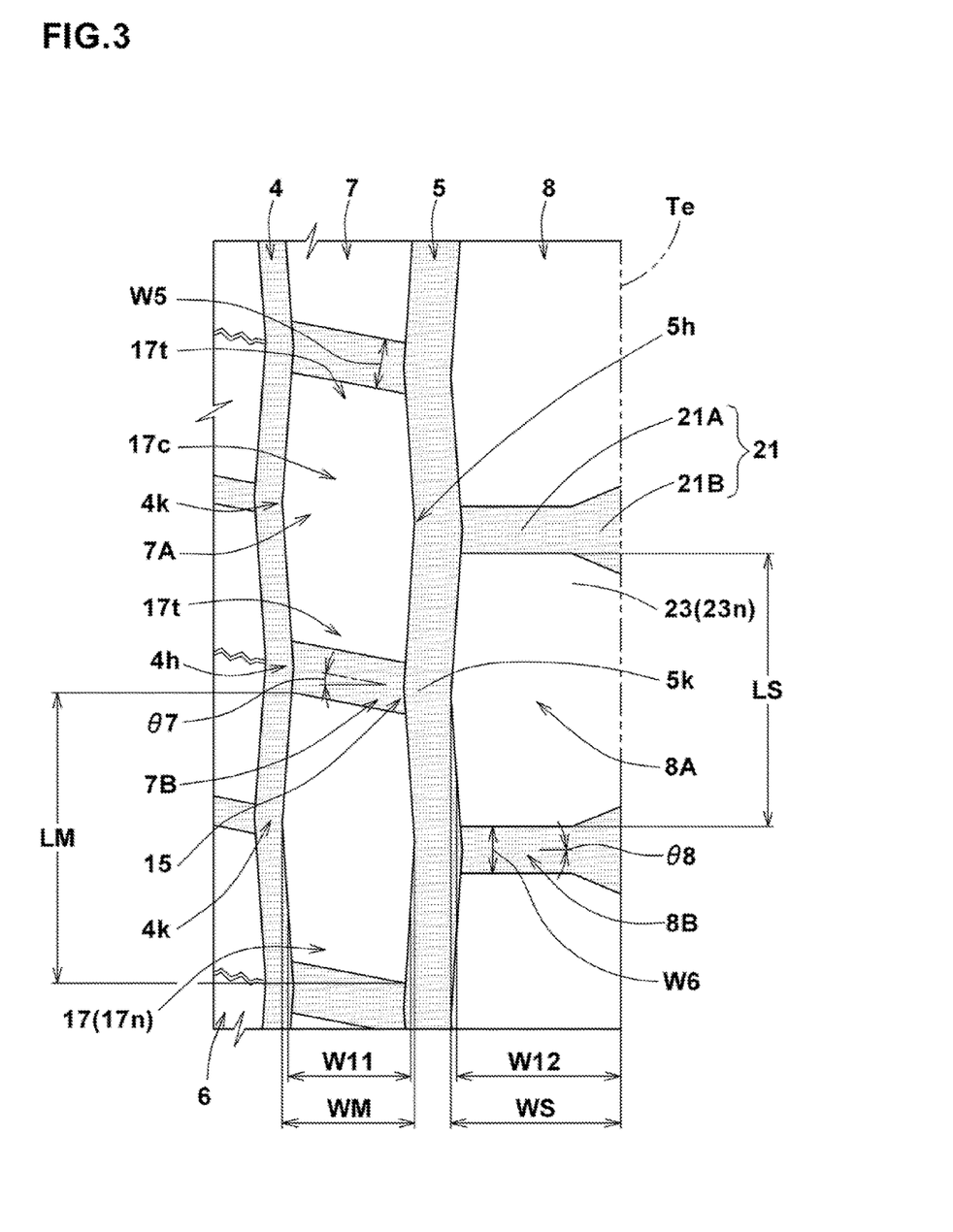

Each of the middle main grooves 4 extends zigzag and has axially outwardly protruding zigzag vertex portions 4h and axially inwardly protruding zigzag vertex portions 4k as shown in FIG. 2.

The middle main groove 4 comprises alternate first middle groove segments 4A and second middle groove segments 4B which are inclined with respect to the tire circumferential direction and which extend between the zigzag vertex portions 4h and 4k as shown in FIG. 2.

Toward one tire circumferential direction,
the first middle groove segments 4A are inclined to one tire axial direction, and
the second middle groove segments 4B are inclined to the other tire axial direction.
The middle main groove 4 has axial components. This increases the shearing force of the compacted snow.

The first middle groove segments 4A and the second middle groove segments 4B may have different circumferential lengths. But, in this embodiment, the first middle groove segments 4A and the second middle groove segments 4B have the same circumferential length.

Such middle main groove 4 equalizes the pattern rigidity between the land portions on both sides thereof to even the wear. In the land portions near the middle main grooves 4, the ground pressure during straight running is low in comparison with the land portions near the center main groove 3.

Therefore, it is preferable to improve the wear resistance, giving priority to equalization of the rigidity of the land portions than prevention of deformation of the land portions.

In order to effectively derive the above-mentioned advantageous effects, the first middle groove segments 4A and the second middle groove segments 4B are preferably inclined with respect to the tire circumferential direction at an angle θ3 less than the angle θ2 and less than the angle θ1 of the center main groove 3.

The angle θ3 is preferably set in a range of not less than 1 degree, more preferably not less than 2 degrees, but not more than 9 degrees, more preferably not more than 8 degrees.

If the angle θ3 of the middle main grooves 4 is excessively small, there is a possibility that the shearing force of the compacted snow formed by the middle main grooves 4 is decreased.

If the angle θ3 of the middle main grooves 4 is large, the land portions near the both sides of the middle main groove 4 are decreased in the circumferential rigidity, and there is a possibility that the difference between wear of the land portions on both sides of the center main groove 3 and wear of the land portions on both sides of the middle main groove 4 increases.

In order to effectively derive the above-mentioned advantageous effects, the groove width w2 of the middle main grooves 4 is preferably set in a range of from 1.0% to 6.0% of the tread width TW.

It is preferable that the angle θ3 of the middle main groove 4 with respect to the tire circumferential direction is more than the angle θ4 of the shoulder main groove 5 with respect to the tire circumferential direction.

During straight running, the land portions on both sides of the middle main groove 4 are applied by higher ground pressure than the land portions on both sides of the shoulder main groove 5. Therefore, by increasing the shearing force of the compacted snow formed by the middle main grooves 4, the traveling performance on snowy roads during straight running in particular can be improved.

If the angle θ3 of the middle main groove 4 is excessively large, there is a possibility that the resistance to drainage is increased, and wet performance is deteriorated.

Therefore, the angle θ3 of the middle main grooves 4 is preferably set in a range of from 2 to 8 degrees.

It is preferable that the groove width w2 of the middle main grooves 4 is more than the groove width w1 of the center main groove 3.

Thereby, the pattern rigidity of the land portion near the tire equator C subjected to higher ground pressure during straight running can be increased, and the uneven wear resistance is improved.

Preferably, the groove width w2 is set in a range of from 1.5 to 3.0 times the groove width w1 in order to eject the snow in each main groove 3, 4 while exerting the above function.

In this embodiment, the groove width w2 of each middle main groove 4 is constant along its length.

Each of the shoulder main grooves 5 extends zigzag and has axially outwardly protruding zigzag vertex portions 5h and axially inwardly protruding zigzag vertex portions 5k.

The shoulder main groove 5 comprises alternate first shoulder groove segments 5A and second shoulder groove segments 5B which are inclined with respect to the tire circumferential direction and which extend between the zigzag vertex portions 5h and 5k.

Toward one tire circumferential direction,
the first shoulder groove segments 5A are inclined to one tire axial direction at an angle θ4, and
the second shoulder groove segments 5B are inclined to the other tire axial direction at an angle θ4.
Preferably, the angle θ4 is not less than 1 degree, but not more than 7 degrees.

Such shoulder main grooves 5 can improve the traveling performance on snowy roads.

The first shoulder groove segments 5A and the second shoulder groove segments 5B may have different circumferential lengths, but in this embodiment, the first shoulder groove segments 5A and the second shoulder groove segments 5B have the same circumferential length.

Such shoulder main groove 5 equalizes the pattern rigidity between the land portions on both sides of the shoulder main groove 5 to even the wear.

It is preferable that the groove width w3 of the shoulder main grooves 5 is more than the groove width w2 of the middle main grooves 4. The groove width w3 is preferably set in a range of from 2.0 to 4.0 times the groove width w1 of the center main groove 3.

Such shoulder main grooves 5 secure the groove volume in the tread portion 2 as a whole, and the shearing force of the compacted snow can be effectively brought out.

For example, the groove depths of the main grooves 3, 4 and 5 are set in a range of from 10 to 16.5 mm.

By the main grooves 3, 4 and 5, the tread portion 2 is axially divided into six land portions: two crown land portions 6 between the center main groove 3 and the middle main grooves 4; two middle land portions 7 between the middle main grooves 4 and the shoulder main grooves 5; and two shoulder land portions 8 between the shoulder main grooves 5 and the tread edges Te.

Figure 4:
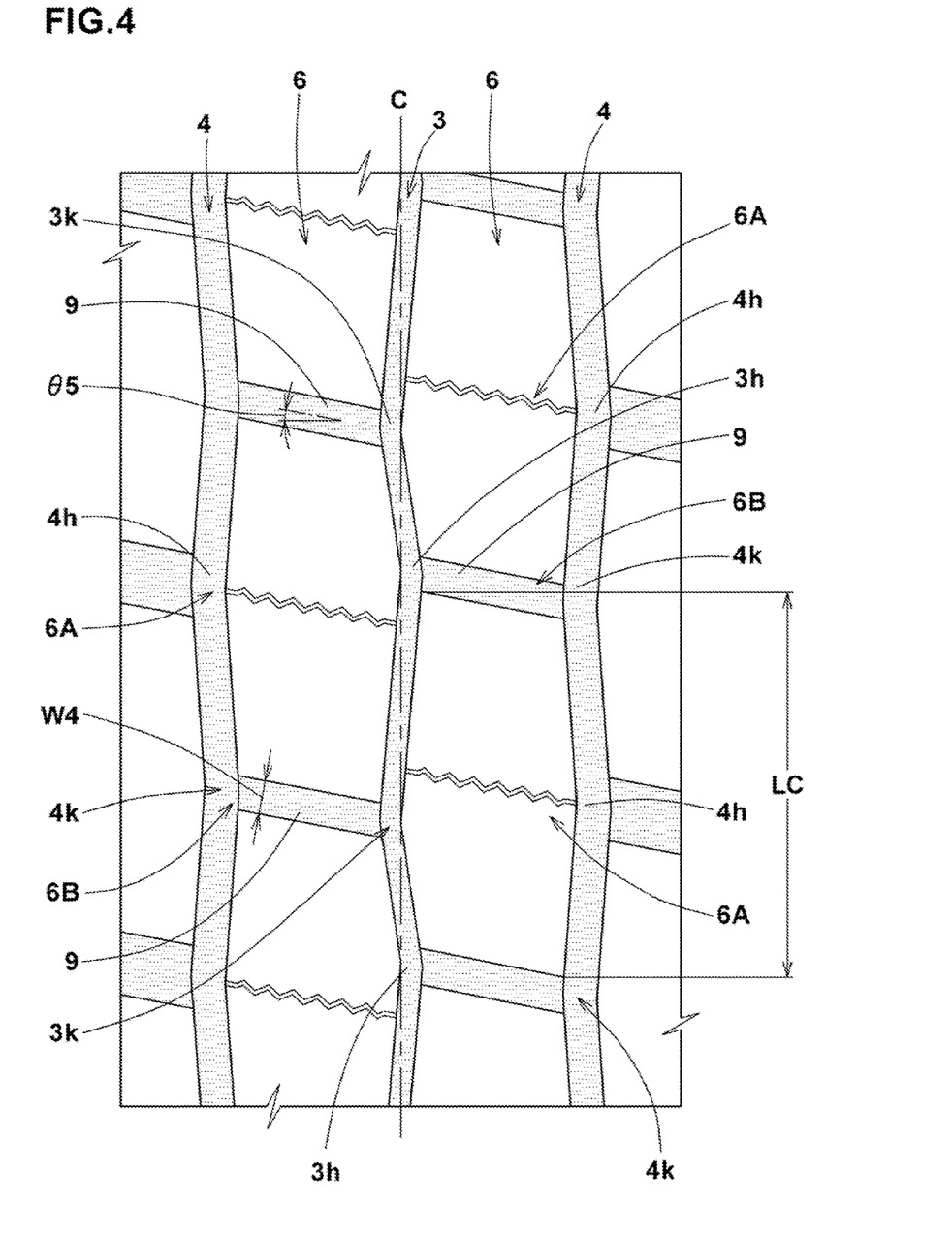
FIG. 4 and FIG. 5 are a closeup of the crown land portion thereof.
Figure 5:
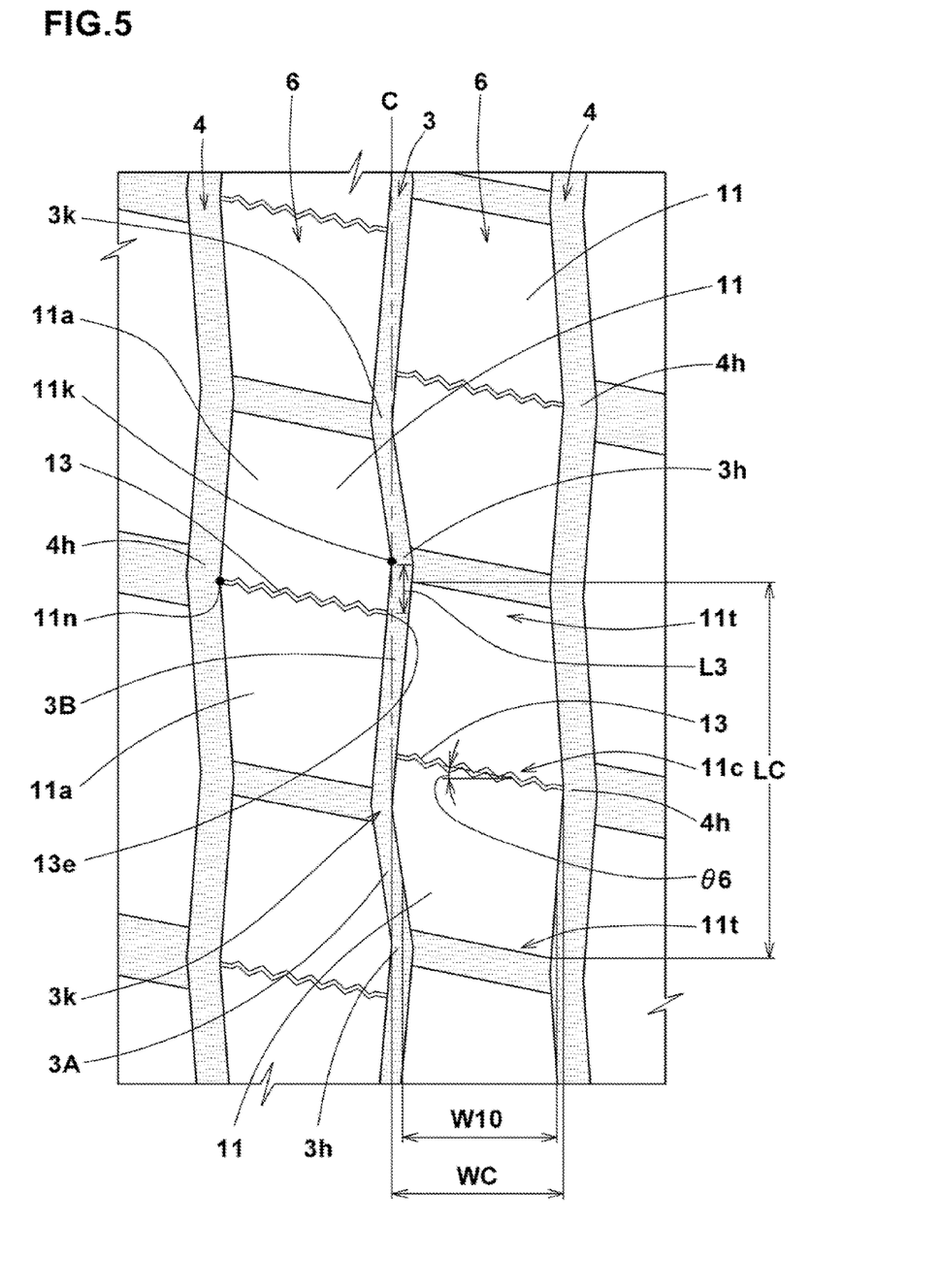

The center main groove 3 and the middle main grooves 4 have substantially same zigzag pitches, and as shown in FIG. 4, the zigzag phase of each middle main groove is shifted by a half zigzag pitch in the tire circumferential direction from that of the center main groove 3.

Therefore, the axial width of each crown land portion 6 repeats increase and decrease in the tire circumferential direction, namely, periodically changes, and the crown land portion 6 has maximum width portions 6A where the axial width is maximum and minimum width portions 6B where the axial width is minimum which occur alternately in the tire circumferential direction. Each maximum width portion 6A is formed between one of the axially outwardly protruding zigzag vertex portions 4h of the middle main groove 4, and one of the zigzag vertex portions 3h, 3k of the center main groove 3 adjacent to the vertex portion 4h. Each minimum width portion 6B is formed between one of the zigzag vertex portions 4k of the inside of the zigzag of the middle main groove 4, and one of the zigzag vertex portions 3h, 3k of the center main groove 3 adjacent to the zigzag vertex portion 4k.

Each crown land portion 6 is provided in each minimum width portion 6B with a crown lateral groove 9.

Since the crown lateral groove 9 has a large axial component, and exerts large shearing force of the compacted snow. since the crown lateral groove 9 is formed in the minimum width portion 6B subjected to a higher ground pressure, it is possible to produce stiff compacted snow.

Each of the crown lateral grooves 9 extends straight. Thereby, on both sides in the tire circumferential direction of the crown lateral groove 9, the rigidity of the crown land portion 6 becomes high, therefore, the heel-and-toe wear can be prevented.

The crown lateral grooves 9 are inclined with respect to the tire axial direction at an angle θ5.

Such crown lateral groove 9 also has a circumferential component, therefore, snow in the crown lateral groove 9 can be discharged to the main grooves 3, 4 on both sides thereof by utilizing rotations of the tire.

With respect to the tire axial direction, all of the crown lateral grooves 9 and the above-mentioned first oblique groove segments 3A of the center main groove 3 are inclined to one tire circumferential direction.

Thereby, snow in the first oblique groove segments 3A whose angle is more than the second oblique groove segments 3B can be discharged toward the middle main grooves 4 through the crown lateral groove 9 by the rotation of the tire, therefore, the traveling performance on snowy roads can be further improved.

The angle θ5 of the crown lateral groove 9 is preferably set in a range of from 5 to 15 degrees with respect to the tire axial direction.

If the angle θ5 is large, there is a possibility that the rigidity of the crown land portion 6 is decreased near the crown lateral groove 9.

The axial length L2 of each crown lateral groove 9 is preferably set in a range of from 9% to 17% of the tread width TW.

If the axial length L2 of the crown lateral groove 9 is less than 9% of the tread width TW, there is a possibility that the rigidity of the crown land portion 6 is decreased near the crown lateral groove 9. If the axial length L2 of the crown lateral groove 9 is more than 17% of the tread width TW, there is a possibility that snow in the crown lateral groove 9 becomes hard to be discharged, and the traveling performance on snowy roads is deteriorated.

It is preferable that the groove width w4 of the crown lateral grooves 9 is more than the groove width w1 of the center main groove 3. The groove width w4 is preferably set in a range of from 1.2 to 2.4 times the groove width w1. Thereby, large shearing force of the compacted snow can be obtained, while maintaining the pattern rigidity of the crown land portion 6.

In this embodiment, the groove width w4 of each crown lateral groove 9 is constant along its length.

The groove depth of the crown lateral groove 9 is preferably set in a range of from 90% to 98% of the groove depth of the middle main groove 4 in order to improve the traveling performance on snowy roads and the uneven wear resistance in good balance.

By the crown lateral grooves 9, each of the crown land portions 6 is circumferentially divided into a circumferential row of crown blocks 11 each having a hexagonal tread whose axial width w10 gradually decreases from its center portion 11c toward each end 11t in the tire circumferential direction.

Thereby, the both end portions (11t) of the crown block 11 are appropriately deformed when contacting with and leaving from the road surface. Accordingly, their slippage on the road surface is reduced, and wear energy in the both end portions (11t) is reduced to effectively improve the uneven wear resistance.

The aspect ratio (LC/WC) of the maximum circumferential length LC to the maximum axial width WC of the crown block 11 is preferably set in a range of from 2.0 to 2.6.

Thereby, the circumferential rigidity of the crown block 11 is increased, and the groove width w4 of the crown lateral groove 9 is secured to maintain the traveling performance on snowy roads.

In this embodiment, each of the crown blocks 11 is provided with a crown sipe 13 extending between the center main groove 3 and the adjacent middle main groove 4, and thereby, the crown block 11 is subdivided into two crown block pieces 11a. Such crown sipe 13 exerts edge effect and improves traveling performance on snowy/icy roads.

In this embodiment, the crown sipe 13 is zigzag. Thereby, the crown block pieces 11a and 11a are prevented from being deformed toward the tire axial direction, and the effect to prevent the slippage on the road surface can be enhanced. Aside from such zigzag configuration, the crown sipe 13 may be formed with a wavy, or sinusoidal, or straight configuration.

In this embodiment, the crown sipe 13 extends between one of the second oblique groove segments 3B of the center main groove and
one of the axially outwardly protruding zigzag vertex portions 4h of the middle main groove 4.

The crown sipe 13 does not open at any of the zigzag vertex portions 3h, 3k of the center main groove 3.

Therefore, the rigidity of the crown block 11 at the axially inwardly protruding end 11k is maintained.

Since this part is applied by higher ground pressure, the snow in the crown lateral groove 9 near the protruding end ilk and the first oblique groove segment 3A can be further stiffly compacted. Further, since the crown sipe 13 is opened at the axially outwardly protruding zigzag vertex portion 4h of the middle main groove 4, it is possible to appropriately decrease the rigidity of the crown block 11 at the axially outwardly protruding end 11n. Thereby, the ground pressure becomes low at the position where the first middle groove segment 4A meets the second middle groove segment 4B, which furthers the open and close of the groove walls of the middle main groove 4, and the snow in the middle main groove 4 can be smoothly discharged backward of the rotation direction. Accordingly, the traveling performance on snowy roads can be further improved.

It is preferable that the circumferential distance L3 between the open end 13e of the crown sipe 13 at the center main groove and the axially inwardly protruding end ilk of the crown block 11 is set in a range of from 10% to 20% of the maximum circumferential length LC of the crown block 11.

If the distance L3 is less than 10% of the maximum length LC of the crown block 11, there is a possibility that the rigidity of the crown block 11 at the protruding end 11k is excessively decreased, and snow can not be compressed in order to increase the shearing force of the compacted snow.

If the distance L3 is more than 20% of the maximum length LC of the crown block 11, there is a possibility that the rigidity balance between the paired crown block pieces 11a and 11a is lost, and the difference in wear between the block pieces 11a and 11a is increased.

It is preferable that, with respect to the tire axial direction, the crown sipe 13 is inclined to the same direction as that of the crown lateral grooves 9.

Thereby, the circumferential rigidity of the crown block piece 11a can be uniformed along the tire axial direction, and the wear difference can be decreased.

In order to effectively derive such advantages effects, it is preferred that, with respect to the tire axial direction, the crown sipe 13 (in this embodiment, its zigzag amplitude center line) is inclined at an angle θ6 equal to the angle θ5 of the crown lateral grooves 9.

The depth of the crown sipe 13 is preferably set in a range of not less than 80%, more preferably not less than 84%, but not more than 96%, more preferably not more than 92% of the groove depth of the middle main groove 4.

In this embodiment, the shoulder main grooves 5 have substantially same zigzag pitches as those of the middle main grooves 4, and as shown in FIG. 4, the zigzag phase of each shoulder main groove 5 is shifted by a half zigzag pitch in the tire circumferential direction from that of the adjacent middle main groove 4. Therefore, the middle land portion 7 has an axial width which repeats increase and decrease in the tire circumferential direction, namely, periodically changes, and the middle land portion 7 has maximum width portions 7A where the axial width is maximum and minimum width portions 7B where the axial width is minimum which occur alternately in the tire circumferential direction. Each maximum width portion 7A is formed between one of the axially inwardly protruding zigzag vertex portions 4k of the middle main groove 4, and one of the axially outwardly protruding zigzag vertex portions 5h of the shoulder main groove 5 adjacent to the zigzag vertex portion 4k.

Each minimum width portion 7B is formed between one of the axially outwardly protruding zigzag vertex portions 4h of the middle main groove 4, and one of the axially inwardly protruding zigzag vertex portions 5k of the shoulder main groove 5 adjacent to the zigzag vertex portion 4h.

Each of the middle land portions 7 is provided in each minimum width portion 7B with a middle lateral groove 15. Since the middle lateral groove 15 has a large axial component, the traveling performance on snowy roads is improved. Further, since the middle lateral groove 15 disposed in the minimum width portion 7B is subjected to higher ground pressure, stiff compacted snow can produced.

Each of the middle lateral grooves 15 extends straight. Thereby, high rigidity of the middle land portion 7 on both sides of the middle lateral groove 15 is maintained, and the slippage on the road surface can be suppressed.

The middle lateral grooves 15 are inclined with respect to the tire axial direction at an angle θ7.

Such middle lateral groove 15 has a circumferential component, therefore, snow in the middle lateral groove 15 can be discharged toward the main grooves 4, 5 on both sides thereof by utilizing rotations of the tire.

It is preferable that the angle θ7 of the middle lateral grooves 15 is less than the angle θ5 of the crown lateral grooves 9. The angle θ7 is preferably set in a range of from 4 to 14 degrees.

In general, during cornering, the axially outer land portion is subjected to larger lateral force. Therefore, in order to decrease the difference in wear between the crown land portion 6 and the middle land portion 7, it is desirable to increase the rigidity in the tire axial direction of the middle land portion 7 more than the rigidity in the tire axial direction of the crown land portion 6.

Preferably, the groove width w5 of the middle lateral groove 15 is more than the groove width W4 of the crown lateral groove 9. The groove width W5 is preferably set in a range of from 1.5 to 2.5 times the groove width w4.

Thereby, by making the circumferential rigidity of the middle land portion 7 as being lower than the circumferential rigidity of the crown land portion 6, the wear can be evened based on the difference in the ground pressure between the crown land portion 6 and the middle land portion 7.

In general, an automobile has much more opportunity for traveling straight than cornering, therefore, by configuring the middle land portion 7 such that the circumferential rigidity becomes higher than the rigidity in the tire axial direction, wear caused by circumferential force and wear caused by axial force can be evened.

For that purpose, the groove width W5 of the middle lateral groove 15 is preferably more than the groove width w3 of the shoulder main groove 5. The groove width w5 is preferably set in a range of from 1.05 to 1.15 times the groove width w3. The groove depth of the middle lateral groove 15 is preferably less than the groove depth of the shoulder main groove 5, and more preferably set in a range of from 68% to 84% of the groove depth of the shoulder main grooves 5.

If the groove depth D1 of the middle lateral groove 15 is excessively small when compared with the groove depth of the shoulder main groove 5, the groove volume of the middle lateral groove 15 becomes small, and there is a possibility that the shearing force of the compacted snow is decreased and the drainage is deteriorated.

Figure 6:
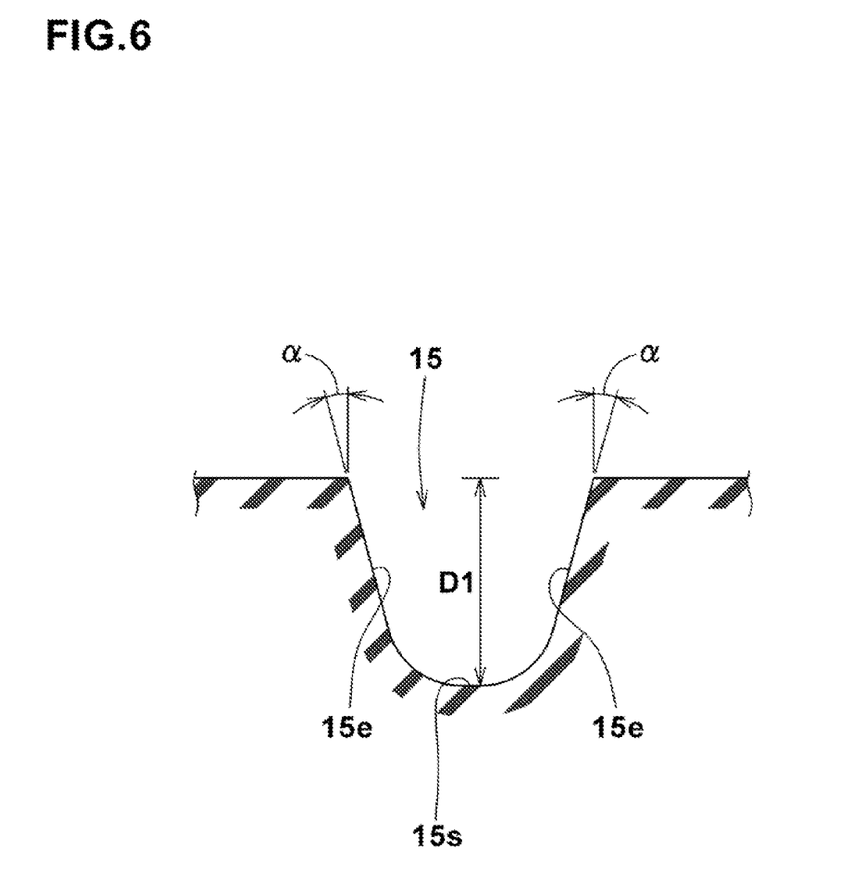
FIG. 6 is a cross sectional view of the middle lateral groove.
Figure 7:
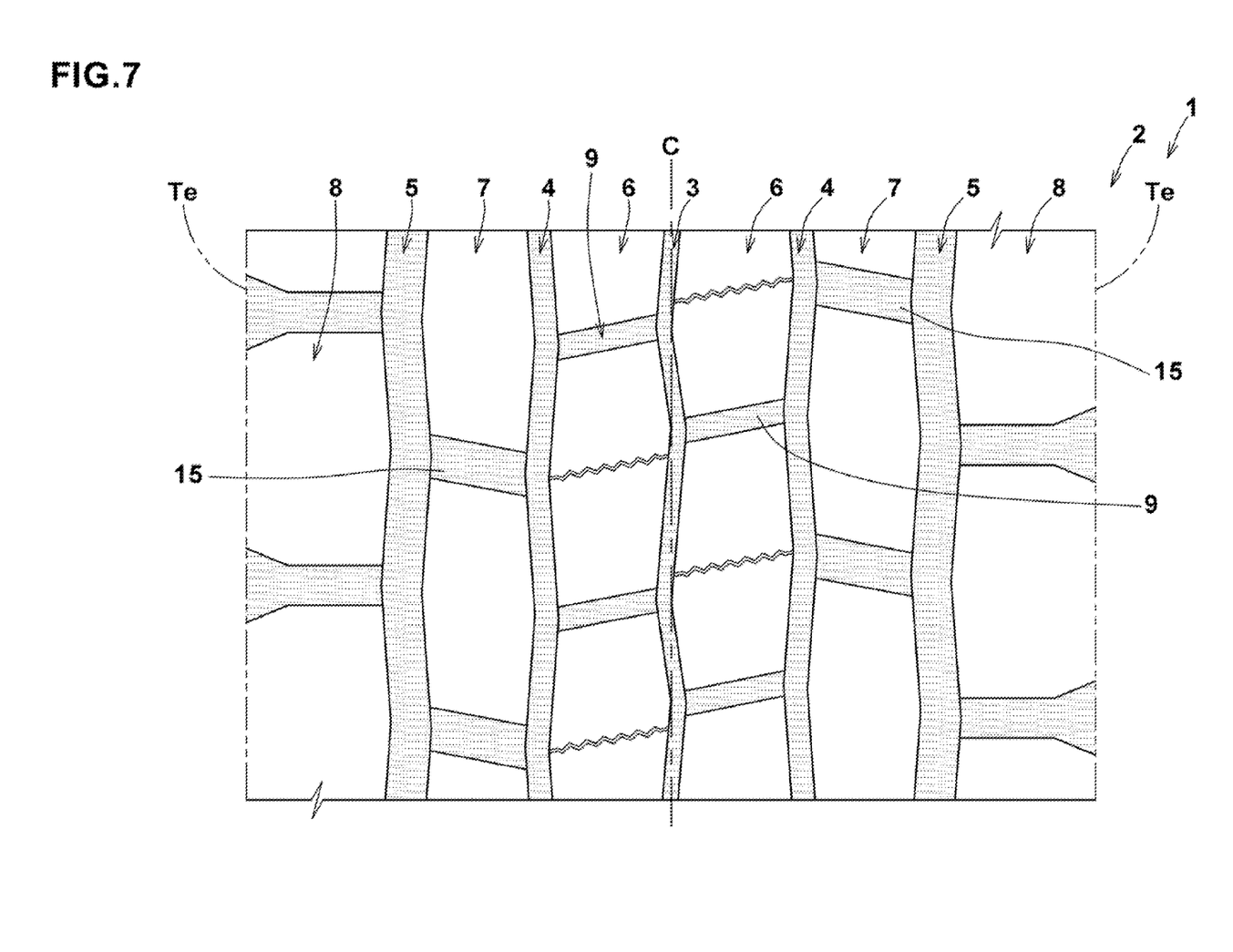
FIG. 7 is a developed partial view of the tread portion of a comparative example.

As shown in FIG. 6, the middle lateral groove 15 has a pair of opposite side walls 15e extending radially outwardly from the groove bottom 15s, while inclining at an angle α which is preferably 6 to 18 degrees.

Such middle lateral groove's side walls 15e can produce stiff compacted snow.

If the inclination angle α of the middle lateral groove's side walls 15e is excessively large, since the groove depth is reduced, it becomes difficult to obtain large shearing force of the compacted snow. If the inclination angle α of the middle lateral groove's side walls 15e is small, it becomes difficult to eject the snow packed in the middle lateral groove 15, and the traveling performance on snowy roads is deteriorated.

By the middle lateral grooves 15, each of the middle land portions 7 is circumferentially divided into a circumferential row of middle blocks 17 each having a hexagonal tread whose axial width w11 gradually decreases from its center portion 17c toward each end 17t in the tire circumferential direction.

Therefore, both end portions (17t) of the middle block 17 are appropriately deformed when contacting with and leaving from the road surface. Accordingly, their slippage on the road surface is suppressed, and wear energy in the both end portions (17t) is reduced to effectively improve the uneven wear resistance.

In this embodiment, the tread 17n of each middle block 17 is not provided with any void such as grooves and sipes. such middle block 17 has high rigidity and uneven wear is prevented.

It is preferable that the aspect ratio (LM/WM) of the maximum circumferential length (LM) to the maximum axial width (WM) of the middle block 17 is less than the above-mentioned aspect ratio (LC/WC) of the crown block 11. Preferably, the aspect ratio (LM/WM) of the middle block 17 is set in a range of from 1.9 to 2.5.

During straight running, the ground pressure of the crown block 11 is higher than the ground pressure of the middle block 17 due to the profile of the tread portion 2. The aspect ratio has a correlation with the circumferential rigidity of the block such that the block with a larger aspect ratio has higher circumferential rigidity. Therefore, by setting the aspect ratio of the middle block less than the aspect ratio of the crown block, it is possible to adjust the circumferential rigidity of the block according to the ground pressure distribution. Thereby, the difference in wear in particular heel-and-toe wear can be reduced between the crown blocks 11 and the middle blocks 17, and uniform wear is obtained.

In this embodiment, by the zigzag shoulder main groove 5, the axial width of the shoulder land portion 8 repeats increase and decrease in the tire circumferential direction, namely, periodically changes, and the shoulder land portion 8 has maximum width portions 8A where the axial width is maximum and minimum width portions 8B where the axial width is minimum which occur alternately in the tire circumferential direction. Each maximum width portion 8A is formed between one of the axially inwardly protruding zigzag vertex portions 5k of the shoulder main groove 5 and the tread edge Te.

Each minimum width portion 8B is formed between one of the axially outwardly protruding zigzag vertex portions 5h of the shoulder main groove 5 and the tread edge Te.

The minimum width portions 8B of the shoulder land portions 8 are each provided with a shoulder lateral groove 21. Such shoulder lateral groove 21 can smoothly discharge snow in the shoulder main groove 5 and snow in the shoulder lateral groove 21 toward the outside of the tread from the tread edge Te.

In this embodiment, each shoulder lateral groove 21 comprises an axially inner portion 21A and an axially outer portion 21B.

The axially inner portion 21A extends axially outwardly from the shoulder main groove 5, and terminating within the shoulder land portion 8.

The axially outer portion 21B extends axially outwardly from the axially inner portion 21A to the tread edge Te, while gradually increasing the groove width.

Such axially outer portion 21B further improves the snow ejecting performance.

The average of the groove width w6 of the shoulder lateral groove 21 is preferably more than 100%, more preferably 105% to 125% of the groove width w5 of the middle lateral groove 15.

Thereby, in the shoulder land portion 8 subjected to larger lateral force than the middle land portion 7, water in the shoulder main groove 5 can be smoothly discharged toward the outside of the tread from the tread edge Te during cornering.

In this embodiment, by the shoulder lateral grooves 21, each of the shoulder land portions 8 is circumferentially divided into a circumferential row of shoulder blocks 23 each having a pentagonal tread whose axial width w12 gradually decreases from its center portion toward each end in the tire circumferential direction.

Such shoulder block 23 exerts an effect to suppress the slippage on the road surface in the same manner as in the middle block 17.

In this embodiment, the tread 23n of each shoulder block 23 is not provided with any void such as grooves and sipes. Such shoulder block 23 has high rigidity and uneven wear is prevented.

It is preferable that the aspect ratio (LS/WS) of the maximum circumferential length (LS) to the maximum axial width (WS) of the shoulder block 23 is less than the aspect ratio (LM/WM) of the middle block 17. The aspect ratio (LS/WS) of the shoulder block 23 is preferably set in a range of from 1.2 to 1.8.

Thereby, it is possible to adjust the circumferential rigidity of the block according to the ground pressure distribution, and the difference in wear in particular heel-and-toe wear between the middle block 17 and the shoulder block 23 can be reduced. The shoulder block 23 is subjected to larger lateral force than the middle block 17, and the block with a smaller aspect ratio has higher axial rigidity. Therefore, it is possible to reduce shoulder wear occurring in the shoulder blocks 23.

The angle θ8 of the widthwise center line of the shoulder lateral groove 21 with respect to the tire axial direction is preferably less than the angle θ7 of the middle lateral groove 15 and preferably not more than 5 degrees. Thereby, the axial rigidity of the shoulder land portion 8 subjected to larger lateral force becomes higher than the axial rigidity of the middle land portion 7, and wear can be uniformed between the middle land portion 7 and the shoulder land portion 8.

Each of the shoulder main grooves 5 has a linearly continuous region 10 extending linearly continuously in the tire circumferential direction in parallel with the tire circumferential direction within the width of the shoulder main groove 5 without contacting with the edges 5e of the shoulder main groove 5. Namely, as shown in FIG. 2, the linearly continuous region 10 is positioned axially outside an axially inner straight line 10i passing through the axially outer end points of the axially inner edge 5i of the shoulder main groove 5 and axially inside an axially outer straight line 10e passing through the axially inner end points of the axially outer edge 5e of the shoulder main groove 5.

Such linearly continuous region 10 reduces the resistance to flow of water in the shoulder main groove 5, and smoothly discharges the water toward the toe-side in the tire rotational direction.

If the axial width wa of the linearly continuous region 10 is large, the pattern rigidity of the land portions on both sides of the shoulder main groove 5 is decreased.

Therefore, the axial width wa of the linearly continuous region 10 is preferably set in a range of from 2% to 8% of the tread width TW.

In order to effectively derive the above-mentioned advantageous effects, the groove width w3 of the shoulder main groove 5 is for example, set in a range of from 3.5% to 10% of the tread width TW.

Each of the middle main grooves 4 has a linearly continuous region 12 extending linearly continuously in the tire circumferential direction in parallel with the tire circumferential direction within the width of the middle main groove 4 without contacting with the edges 4i, 4e of the middle main groove 4.

Namely, the linearly continuous region 12 is positioned axially outside an axially inner straight line 12i passing
- through the axially outer end points of the axially inner edge 4i of the middle main groove 4, and axially inside an axially outer line 12e passing through the
- axially inner end points of the axially outer edge 4e of the middle main groove 4.

Such linearly continuous region 12 reduces the resistance to flow of water in the middle main groove 4, and smoothly discharges the water toward the toe-side in the tire rotational direction.

In general, during straight running, an axially inner land portion is subjected to a higher ground pressure than an axially outer land portion, therefore, slippage in the tire circumferential direction on the road surface is liable to occur in the axially inner land portion more than the axially outer land portion. On the other hand, the wear energy (amount of wear) is directly proportional to the product of the amount of slippage and the ground pressure. Therefore, by setting the axial width wb of the linearly continuous region 12 as being less than the axial width wa of the linearly continuous region 10, it is possible to increase the circumferential rigidity of the land portion near the middle main groove 4 as being higher than the circumferential rigidity near the shoulder main groove 5. Thereby, the slippage of the land portion near the middle main groove 4 is suppressed more than the slippage of the land portion near the shoulder main groove 5. Accordingly, during straight running, wear energy in the land portions on both sides of the middle main groove 4, and wear energy in the land portions on both sides of the shoulder main groove 5 become uniformed, and the uneven wear resistance is improved.

During cornering, on the other hand, since a large lateral force toward the axially outside is occurred, water film beneath a land portion flows toward the axially outside more than toward the axially inside. Therefore, by setting the axial width wb of the linearly continuous region 12 as being less than the axial width Wa of the linearly continuous region 10, namely, by setting the axial width Wa of the linearly continuous region 10 as being larger than the axial width Wb of the linearly continuous region 12, much more water is smoothly discharged by the shoulder main groove 5. Therefore, wet performance is improved.

From this standpoint, the width Wb of the linearly continuous region 12 is preferably set in a range of from 0.5% to 4.5% of the tread width TW.

In this embodiment, the center main groove 3 does not have a linearly continuous region extending linearly continuously in the tire circumferential direction in parallel with the tire circumferential direction within the width of the center main groove 3 without contacting with the edges of the center main groove 3.

In other words, the opposite edges of the center main groove 3 have an overlap in the tire axial direction.

In this embodiment, the tire equator C is positioned within the axial extent of the overlap.

Owing to the width Wa more than the width Wb and the center main groove 3 without a linearly continuous region, it is possible to more uniform the wear energy in the land portions on both sides of each of the shoulder main grooves 5, the middle main grooves 4 and the center main groove 3. Thus the uneven wear resistance can be further improved.

From this standpoint, the center main groove 3 may be provided with a linearly continuous region whose axial width is smaller than the axial width Wb of the linearly continuous region 12 of the middle main groove 4.

Comparative Test 1

Based on the tread pattern shown in FIG. 1, test tires of size 275/80R22.5 (rim size 7.50×22.5) having specifications shown in Table 1 were experimentally manufactured and tested for the uneven wear resistance and traveling performance on snowy roads.

Specifications common to all of the test tires are as follows:
  tread width Tw: 231 mm
  main grooves' depth: 16.5 mm
  center main groove's width w1: 1.8% of TW
  maximum circumferential length of crown blocks: constant <Uneven Wear (Heel-and-Toe Wear) Resistance>

The test tires were mounted on all wheels of a 10 ton 2-D truck with a vehicle load of 5 tons (tire pressure 900 kPa), and, after running on dry asphalt roads for 60,000 km, the rear tires were measured for the heel-and-toe wear, namely, the difference in the amount of wear between the heel side edge and toe side edge of a block. The measurements were made on the eight crown blocks, eight middle blocks and eight shoulder blocks, and their mean value was calculated.

The results are indicated in Table 1. The smaller the value, the better the uneven wear resistance.

<Traveling Performance on Snowy Roads>

Using the above-mentioned truck, during running on a test course covered with a compacted snow layer, a test driver evaluated the traveling performance of the test tire based on the steering stability, traction, grip and the like.

The results are indicated in Table 1 by an index based on Embodiment tire Ex.1 being 100, wherein the larger the value, the better the performance on snowy roads.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| tread pattern (FIG. No.) | 7 | 1 | 1 | 1 | 1 | 1 | 1 | 1 | 1 | 1 | 1 | 1 | 1 |
| crown lateral groove axial length L2/TW (%) | 13 | 13 | 5 | 9 | 17 | 21 | 13 | 13 | 13 | 13 | 13 | 13 | 13 |
| LC/WC | 2.3 | 2.3 | 2.3 | 2.3 | 2.3 | 2.3 | 1.8 | 2.0 | 2.6 | 2.8 | 2.3 | 2.3 | 2.3 |
| middle main groove angle θ3 (deg.) | 4 | 4 | 4 | 4 | 4 | 4 | 4 | 4 | 4 | 4 | 0.5 | 1 | 7 |
| second oblique groove segment angle θ2 (deg.) | 5 | 5 | 5 | 5 | 5 | 5 | 5 | 5 | 5 | 5 | 5 | 5 | 5 |

TABLE 1-continued

| | | | | | | | | | | | | | |
|---|---|---|---|---|---|---|---|---|---|---|---|---|---|
| crown lateral groove width W4/center main groove width W1 | 1.8 | 1.8 | 1.8 | 1.8 | 1.8 | 1.8 | 1.8 | 1.8 | 1.8 | 1.8 | 1.8 | 1.8 | 1.8 |
| L3/LC (%) | 12 | 12 | 12 | 12 | 12 | 12 | 12 | 12 | 12 | 12 | 12 | 12 | 12 |
| heel-and-toe wear (mm) | 1.4 | 1.0 | 1.3 | 1.2 | 1.2 | 1.4 | 1.4 | 1.2 | 1.2 | 1.3 | 1.0 | 1.0 | 1.4 |
| traveling performance on snowy roads | 90 | 100 | 98 | 100 | 100 | 98 | 98 | 100 | 100 | 98 | 97 | 98 | 101 |

| Tire | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|
| tread pattern (FIG. No.) | 1 | 1 | 1 | 1 | 1 | 1 | 1 | 1 | 1 | 1 | 1 | 1 | 1 |
| crown lateral groove axial length L2/TW (%) | 13 | 13 | 13 | 13 | 13 | 13 | 13 | 13 | 13 | 13 | 13 | 13 | 13 |
| LC/WC | 2.3 | 2.3 | 2.3 | 2.3 | 2.3 | 2.3 | 2.3 | 2.3 | 2.3 | 2.3 | 2.3 | 2.3 | 2.3 |
| middle main groove angle θ3 (deg.) | 9 | 4 | 4 | 4 | 4 | 4 | 4 | 4 | 4 | 4 | 4 | 4 | 4 |
| second oblique groove segment angle θ2 (deg.) | 5 | 0.5 | 1 | 9 | 11 | 5 | 5 | 5 | 5 | 5 | 5 | 5 | 5 |
| crown lateral groove width W4/center main groove width W1 | 1.8 | 1.8 | 1.8 | 1.8 | 1.8 | 0.8 | 1.2 | 2.4 | 2.8 | 1.8 | 1.8 | 1.8 | 1.8 |
| L3/LC (%) | 12 | 12 | 12 | 12 | 12 | 12 | 12 | 12 | 12 | 8 | 10 | 20 | 24 |
| heel-and-toe wear (mm) | 1.4 | 1.3 | 1.3 | 1.1 | 1.1 | 0.8 | 0.9 | 1.1 | 1.2 | 1.2 | 1.1 | 1.1 | 1.3 |
| traveling performance on snowy roads | 102 | 97 | 98 | 98 | 97 | 97 | 100 | 102 | 102 | 97 | 99 | 100 | 99 |

Comparison Test 2

Based on the tread pattern shown in FIG. 1, test tires of size 275/80R22.5 (rim size 7.50×22.5) having specifications shown in Table 2 were experimentally manufactured and tested for the uneven wear resistance, wet performance, and traveling performance on snowy roads.

Specifications common to all of the test tires are as follows:

tread width TW: 231 mm
main grooves' depth: 16.5 mm
main grooves' angles θ4-θ2: constant
lateral grooves' circumferential pitches: constant <Uneven Wear Resistance>

The results are indicated in Table 2. Otherwise same as above.

<Traveling Performance on Snowy Roads>

The results are indicated in Table 2 by an index based on Embodiment tire Ex.1b being 100. Otherwise same as above.

<Wet Performance>

Using the above-mentioned truck, during running on an asphalt road of a test course covered with 6 mm depth of water, a test driver evaluated the traveling performance of the test tire based on the steering stability, traction, grip and the like.

The results are indicated in Table 2 by an index based on Embodiment tire Ex.1b being 100, wherein the larger the value, the better the wet performance.

TABLE 2

| Tire | Ref. 1b | Ex. 1b | Ref. 2b | Ex. 2b | Ex. 3b | Ex. 4b | Ex. 5b | Ref. 3b | Ex. 6b |
|---|---|---|---|---|---|---|---|---|---|
| tread pattern (FIG. No.) | 1 | 1 | 1 | 1 | 1 | 1 | 1 | 1 | 1 |
| width of linearly continuous region | | | | | | | | | |
| shoulder main groove Wa/TW (%) | 1.5 | 3.5 | 1.5 | 1.5 | 2.0 | 5.0 | 5.5 | 3.5 | 3.5 |
| middle main groove Wb/TW (%) | 3.5 | 1.5 | 2.0 | 1.0 | 1.5 | 1.5 | 1.5 | 4.0 | 0.5 |
| center main groove /TW(%) | — | — | — | — | — | — | — | — | — |
| middle block aspect ratio LM/WM | 2.3 | 2.3 | 2.3 | 2.3 | 2.3 | 2.3 | 2.3 | 2.3 | 2.3 |
| uneven wear resistance | 3.8 | 2.0 | 3.0 | 1.8 | 1.8 | 2.6 | 2.8 | 4.5 | 1.8 |
| traveling performance on snowy roads | 95 | 100 | 95 | 97 | 98 | 98 | 97 | 97 | 98 |
| wet performance | 95 | 100 | 90 | 98 | 98 | 98 | 97 | 95 | 98 |

| Tire | Ex. 7b | Ex. 8b | Ref. 4b | Ex. 9b | Ex. 10b | Ex. 11b | Ex. 12b | Ex. 13b | Ex. 14b |
|---|---|---|---|---|---|---|---|---|---|
| tread pattern (FIG. No.) | 1 | 1 | 1 | 1 | 1 | 1 | 1 | 1 | 1 |
| width of linearly continuous region | | | | | | | | | |
| shoulder main groove Wa/TW (%) | 3.5 | 3.5 | 3.5 | 3.5 | 3.5 | 3.5 | 3.5 | 3.5 | 3.5 |
| middle main groove Wb/TW (%) | 2.5 | 3.0 | 3.5 | 1.5 | 1.5 | 1.5 | 1.5 | 1.5 | 1.5 |
| center main groove /TW (%) | — | — | — | 0.5 | 1.5 | — | — | — | — |
| middle block aspect ratio LM/WM | 2.3 | 2.3 | 2.3 | 2.3 | 2.3 | 1.7 | 1.9 | 2.5 | 2.7 |
| uneven wear resistance | 2.6 | 2.6 | 3.2 | 2.3 | 2.7 | 2.5 | 2.3 | 2.2 | 2.5 |
| traveling performance on snowy roads | 97 | 97 | 95 | 100 | 98 | 98 | 100 | 100 | 98 |
| wet performance | 97 | 97 | 95 | 100 | 98 | 98 | 100 | 100 | 98 |

REFERENCE SIGNS LIST 1 heavy duty pneumatic tire
2 tread portion
3 center main groove
3A first oblique groove segments
3B second oblique groove segments
4 middle main grooves
5 shoulder main groove
9 crown lateral grooves 11 crown blocks
10,12 linearly continuous region

The invention claimed is:
1. A heavy duty pneumatic tire comprising
a tread portion provided with circumferentially continuously extending zigzag main grooves, the zigzag main grooves including a center main groove disposed on the tire equator and a middle main groove disposed on each side of the center main groove,
wherein
the center main groove comprises
first oblique groove segments inclined with respect to the tire circumferential direction to one axial direction at an angle, and
second oblique groove segments inclined with respect to the tire circumferential direction to the other axial direction at an angle less than the angle of the first oblique groove segments,
    a crown land portion formed between the center main groove and each of the middle main grooves has an axial width which repeats increase and decrease in the tire circumferential direction, and
    the crown land portion is provided with a plurality of crown lateral grooves extending between
axially outwardly protruding zigzag vertex portions of the center main groove and axially inwardly protruding zigzag vertex portions of the middle main groove so that the crown land portion is circumferentially divided into crown blocks each having a hexagonal tread, and
    the crown lateral grooves of the crown land portions and the first oblique groove segments of the center main groove are inclined with respect to the tire axial direction to one circumferential direction,
wherein
    the crown blocks are each provided with a crown sipe extending between one of the second oblique groove segments of the center main groove and one of the axially outwardly protruding zigzag vertex portions of the adjacent middle main groove, wherein the circumferential distance between an open end of the crown sipe at the center main groove and an axially inwardly protruding end of the crown block is 10% to 20% of the maximum circumferential length (LC) of the crown block.

2. The heavy duty pneumatic tire according to claim 1, wherein
    the angles of oblique groove segments of the middle main grooves with respect to the tire circumferential direction are smaller than the angle of the second oblique groove segments of the center main groove with respect to the tire circumferential direction.

3. The heavy duty pneumatic tire according to claim 1, wherein
    the groove width of the center main groove is less than the groove width of the middle main grooves.

4. The heavy duty pneumatic tire according to claim 1, wherein
    the groove width of the crown lateral grooves is more than the groove width of the center main groove.

5. The heavy duty pneumatic tire according to claim 1, wherein
    the axial length of each said crown lateral groove is in a range of from 9% to 17% of the tread width.

6. The heavy duty pneumatic tire according to claim 1, wherein
    the angle of the middle main grooves with respect to the tire circumferential direction is in a range of from 1 to 9 degrees.

7. The heavy duty pneumatic tire according to claim 1, wherein
    the aspect ratio (LC/WC) of the maximum circumferential length (LC) and maximum axial width (WC) of each said crown block is in a range of from 2.0 to 2.6.

8. A heavy duty pneumatic tire comprising
a tread portion provided with circumferentially continuously extending zigzag main grooves, the zigzag main grooves including a center main groove disposed on the tire equator and a middle main groove disposed on each side of the center main groove,
wherein
    the center main groove comprises
first oblique groove segments inclined with respect to the tire circumferential direction to one axial direction at an angle, and
second oblique groove segments inclined with respect to the tire circumferential direction to the other axial direction at an angle less than the angle of the first oblique groove segments,
    a crown land portion formed between the center main groove and each of the middle main grooves has an axial width which repeats increase and decrease in the tire circumferential direction, and
    the crown land portion is provided with a plurality of crown lateral grooves extending between
axially outwardly protruding zigzag vertex portions of the center main groove and axially inwardly protruding zigzag vertex portions of the middle main groove so that the crown land portion is circumferentially divided into crown blocks each having a hexagonal tread, and
    the crown lateral grooves of the crown land portions and the first oblique groove segments of the center main groove are inclined with respect to the tire axial direction to one circumferential direction,
wherein
    the angle of the first oblique groove segments with respect to the tire circumferential direction is in a range of from 4 to 13 degrees, and
the angle of the second oblique groove segments with respect to the tire circumferential direction is in a range of from 1 to 9 degrees.

9. A heavy duty pneumatic tire comprising
a tread portion provided with circumferentially continuously extending zigzag main grooves, the zigzag main grooves including a center main groove disposed on the tire equator and a middle main groove disposed on each side of the center main groove,
wherein
    the center main groove comprises
first oblique groove segments inclined with respect to the tire circumferential direction to one axial direction at an angle, and
second oblique groove segments inclined with respect to the tire circumferential direction to the other axial direction at an angle less than the angle of the first oblique groove segments,
    a crown land portion formed between the center main groove and each of the middle main grooves has an axial width which repeats increase and decrease in the tire circumferential direction, and
    the crown land portion is provided with a plurality of crown lateral grooves extending between axially outwardly protruding zigzag vertex portions of the center main groove and axially inwardly protruding zigzag vertex portions of the middle main groove so that the crown land portion is circumferentially divided into crown blocks each having a hexagonal tread, and the crown lateral grooves of the crown land portions and the first oblique groove segments of the center main groove are inclined with respect to the tire axial direction to one circumferential direction, wherein said zigzag main grooves further include two shoulder main grooves as the axially outermost zigzag main grooves, a middle land portion formed between each of the shoulder main grooves and the adjacent middle main groove has an axial width which repeats increase and decrease in the tire circumferential direction, the middle land portion is provided with a plurality of middle lateral grooves extending between axially outwardly protruding zigzag vertex portions of the middle main groove and axially inwardly protruding zigzag vertex portions of the shoulder main groove so that the middle land portion is circumferentially divided into middle blocks each having a hexagonal tread, and each of the middle main grooves has a linearly continuous region extending linearly continuously in the tire circumferential direction in parallel with the tire circumferential direction within the width of the middle main groove without contacting with the edges of the middle main groove, each of the shoulder main grooves has a linearly continuous region extending linearly continuously in the tire circumferential direction in parallel with the tire circumferential direction within the width of the shoulder main groove without contacting with the edges of the shoulder main groove, and the axial width of the linearly continuous region of the middle main grooves is less than the axial width of the linearly continuous region of the shoulder main grooves.

10. The heavy duty pneumatic tire according to claim 9, wherein the tread portion is provided with shoulder lateral grooves extending between the shoulder main grooves and the tread edges, the groove width of the crown lateral grooves is less than the groove width of the middle lateral grooves, and the groove width of the shoulder lateral grooves is more than the groove width of the middle lateral grooves.

11. The heavy duty pneumatic tire according to claim 9, wherein the depth of the middle lateral grooves is less than the groove depth of the shoulder main grooves.

12. The heavy duty pneumatic tire according to claim 9, wherein the groove width of the middle lateral grooves is more than the groove width of the shoulder main grooves.

13. The heavy duty pneumatic tire according to claim 9, wherein a pair of opposite side walls of each said middle lateral groove are inclined at an angle of 6 to 18 degrees.

14. The heavy duty pneumatic tire according to claim 9, wherein the aspect ratio LM/WM of the maximum circumferential length LM to the maximum axial width WM of each of the middle blocks is 1.9 to 2.5.

* * * * *